(12) United States Patent
Asr et al.

(10) Patent No.: US 11,110,809 B2
(45) Date of Patent: Sep. 7, 2021

(54) VEHICLE ENERGY CONSUMPTION DURING CHARGING

(71) Applicant: Ford Global Technologies, LLC, Dearborn, MI (US)

(72) Inventors: Navid Rahbari Asr, Livonia, MI (US); Jeffery R. Grimes, Canton, MI (US); Charles Everett Badger, II, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 16/100,685

(22) Filed: Aug. 10, 2018

(65) Prior Publication Data

US 2020/0047622 A1    Feb. 13, 2020

(51) Int. Cl.
| H02J 7/00 | (2006.01) |
| B60L 53/00 | (2019.01) |
| B60L 58/12 | (2019.01) |
| B60K 6/20 | (2007.10) |

(52) U.S. Cl.
CPC ............... B60L 53/00 (2019.02); B60L 58/12 (2019.02); H02J 7/0071 (2020.01); H02J 7/00712 (2020.01); H02J 7/007188 (2020.01); B60K 6/20 (2013.01); B60L 2240/662 (2013.01); B60L 2250/14 (2013.01); B60L 2250/16 (2013.01); B60L 2260/54 (2013.01); B60Y 2200/91 (2013.01); B60Y 2200/92 (2013.01); B60Y 2300/91 (2013.01); Y02T 10/62 (2013.01); Y02T 90/12 (2013.01); Y02T 90/14 (2013.01)

(58) Field of Classification Search
CPC ...... B60L 53/00; B60L 58/12; B60L 2250/16; B60L 1/00; B60L 53/62; B60L 2250/14; B60L 2240/662; B60L 2260/54; B60L 2240/80; H02J 7/007188; H02J 7/0071; H02J 7/00712; H02J 7/00032; H02J 7/0068; H02J 7/0047; B60Y 2300/91; B60Y 2200/91; B60Y 2200/92; B60K 6/20; B60K 6/48; Y02T 90/12; Y02T 90/14; Y02T 10/7072; Y02T 10/70; Y02T 90/16; Y02T 10/72

USPC .......................................... 320/109; 701/22
See application file for complete search history.

(56) References Cited

U.S. PATENT DOCUMENTS

| 2011/0068740 | A1 | 3/2011 | Ang | |
| 2011/0175569 | A1* | 7/2011 | Austin | B60L 53/63 320/109 |
| 2013/0116868 | A1* | 5/2013 | Erko | B60L 53/64 701/22 |
| 2017/0282738 | A1 | 10/2017 | Miller et al. | |

FOREIGN PATENT DOCUMENTS

DE      102011109422 A1     2/2013

* cited by examiner

*Primary Examiner* — Zixuan Zhou
(74) *Attorney, Agent, or Firm* — David Kelley; Brooks Kushman, P.C.

(57) ABSTRACT

A vehicle system includes a battery, and a charge controller configured to, for a first cycle, initiate charging of the battery at a first start time identified from a defined charge complete time and a first energy estimate of non-charging loads, and, for a next charge cycle and same defined charge complete time, initiate charging of the battery at a next start time, later than the first start time, identified from the same defined charge complete time and actual energy consumed by the non-charging loads during the first cycle.

13 Claims, 5 Drawing Sheets

VEHICLE ENERGY CONSUMPTION DURING CHARGING

TECHNICAL FIELD

The present disclosure relates to systems and methods for initiating charging at a predefined start time to fully charge a traction battery by a defined charge complete time.

BACKGROUND

A hybrid or an electric vehicle may be equipped with at least one traction battery configured to provide energy for propulsion. The traction battery may also provide energy for other vehicle electrical components. For example, the traction battery may transfer energy to high voltage loads, such as compressors and electric heaters. In another example, the traction battery may provide energy to low voltage loads.

SUMMARY

A vehicle system includes a battery, and a charge controller configured to, for a first cycle, initiate charging of the battery at a first start time identified from a defined charge complete time and a first energy estimate of non-charging loads, and, for a next charge cycle and same defined charge complete time, initiate charging of the battery at a next start time, later than the first start time, identified from the same defined charge complete time and actual energy consumed by the non-charging loads during the first cycle.

A method includes, by a controller, for a first cycle, charging a battery at a first start time identified from a predefined complete time, and, for a next cycle and same predefined complete time as the first cycle, charging the battery at a next start time, later than the first start time, identified from the same predefined complete time and actual energy consumed by non-charging loads during the first cycle.

A vehicle system includes a battery, and a charge controller configured to for a first cycle, charge the battery at a first rate identified from a defined charge complete time, and, for a next charge cycle and same defined charge complete time, charge the battery at a next rate, less than the first rate, identified from the same defined charge complete time and an actual energy consumed by non-charging loads during the first cycle.

DETAILED DESCRIPTION

Figure 1:
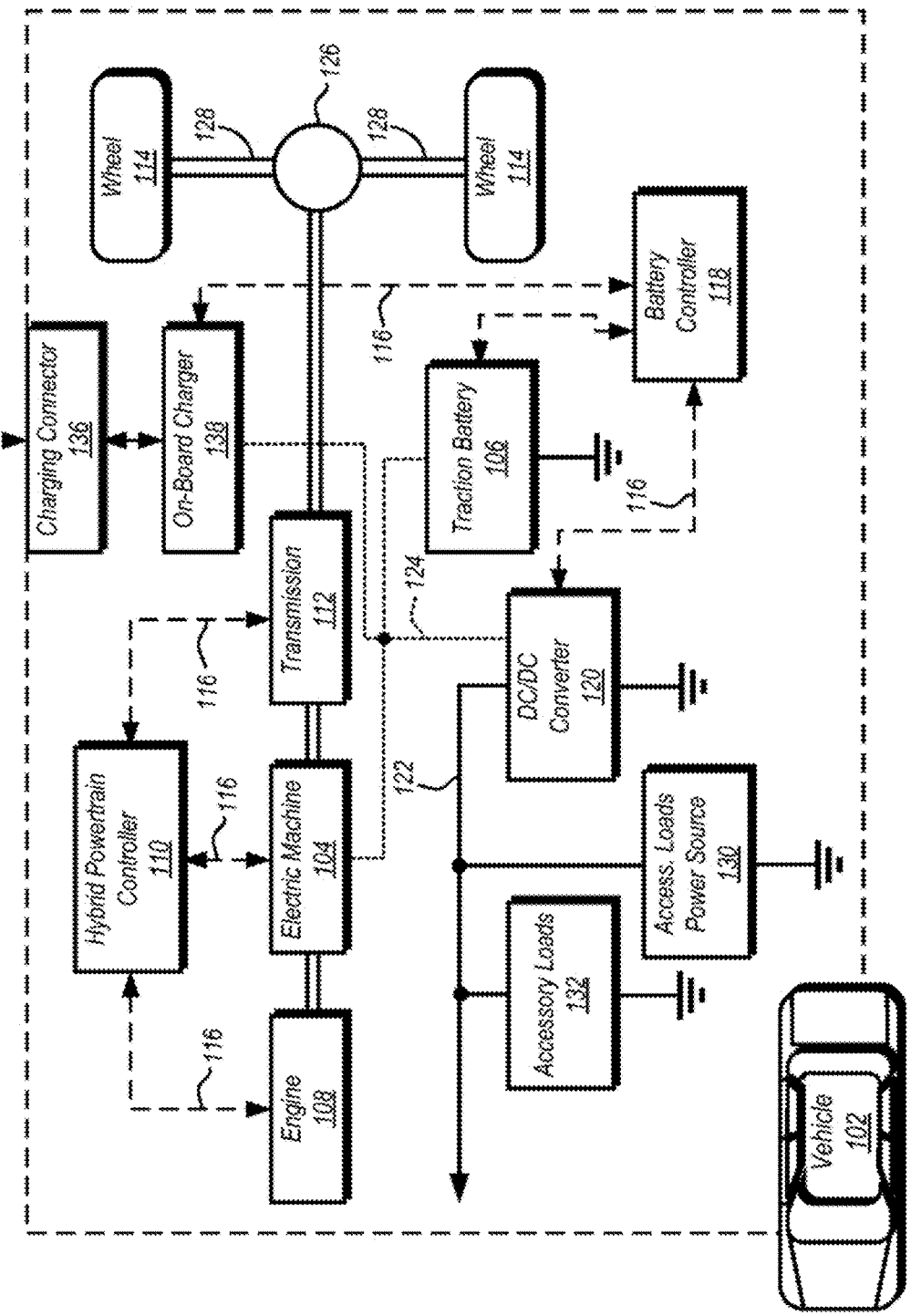
FIG. 1 is a block diagram illustrating a plug-in hybrid electric vehicle (PHEV)

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A hybrid or electric vehicle may include both main and auxiliary electrical buses configured to power one or more electrical loads. The electrical loads may be propulsion electrical loads configured to actively transfer energy to cause the vehicle to change position or to prepare the vehicle to change position. Examples of propulsion loads may include, but are not limited to, electrical machines, an engine, and a traction battery. Additionally or alternatively, electrical loads of the vehicle may include non-propulsion electrical loads configured to power one or more supporting operations of the vehicle, such as interior climate control, accessory lighting, user interface, navigation subsystem, audio and video subsystems, in-vehicle network operation, and so on. Still other examples of the vehicle electrical loads may include, but are not limited to, one or more auxiliary power sources, infotainment and navigation system components, climate control system components, and cooling and heating system components that maintain temperature of vehicle components within a predefined range.

One or more vehicle electrical loads (propulsion or non-propulsion) may be active during charging of the traction battery by an off-board charger. When an electric vehicle (EV) is plugged in and charging, part of the charging energy may be dedicated to powering non-charging loads, such as, but not limited to, one or more coolant pumps, heaters, auxiliary battery, cabin climate control loads, and so on. Said another way, at least some energy transferred to the vehicle by the off-board charger to recharge the traction battery may be diverted to power electrical loads other than the traction battery itself. In some instances, these non-charging loads may use a sizeable portion of the charging load yet they are not observable at the beginning of charging. This is in contrast to a main charging load (e.g., traction battery) that, in some instance, may be estimated at the beginning of a charging session based on a present state-of-charge (SOC) of a high voltage (HV) traction battery.

Imprecise estimation of energy used by non-charging loads may cause errors in estimating the energy required to fulfill the charging session and consequently result in errors in charge time estimation and charge scheduling. Calculating an amount of energy that will be used by the non-charging loads during a charging session may be challenging because multiple interacting factors may be involved.

As one example, a start time at which to initiate charging to fully charge the traction battery by defined charge complete time may depend on one or more of the SOC of the HV battery (the lower the SOC, the higher the charging time), available power of the charging station, target SOC the user has planned for, charge schedule of the vehicle that may depend on both value charge setting which itself depends on customer charging pattern and a time of day and year, SOC of the low voltage (LV) battery (the lower the SOC, the higher the LV loads), capacity of the HV battery that may degrade with time/usage, capacity of the LV Battery that may degrade with time/usage and depends on the driving pattern of the customer. As another example, some thermal loads during charging, such as, but not limited to, operating temperatures of each of the HV battery, charger, and DC/DC converter, may be unknown prior to beginning of charging.

An adaptive non-charging loads energy controller may be configured to learn the non-charging loads during charging based on a difference between respective current output by the charger and input to the traction battery. In some instances, the adaptive non-charging loads energy controller may be further configured to consider multiple observable factors, such as, but not limited to, the SOC of the HV and LV battery, available power from charging station, and present date or time of day. The adaptive non-charging loads energy controller may be configured to learn an effect of the unobservable factors on the non-charging loads based on a comparison between the observable factors and final charge time of the HV battery.

In one example, the adaptive non-charging loads energy controller may be configured to estimate the non-charging loads energy at the beginning of charging based on observable factors. In another example, an actual non-charging loads energy may be calculated during the charging session by integrating the non-charging loads energy over time. In some instances, energy consumed by the non-charging loads may be a product of voltage and a difference between respective charger and HV battery currents. In still another example, a difference between the actual value and estimated value may be transferred to the estimator using a feedback system to update the estimated energy consumption values.

The adaptive non-charging loads energy controller may be configured to estimate the non-charging loads energy for this charging session based on power consumption values resulting from one or more prior charging events. In one example, during initiation of a charging event, the adaptive non-charging loads energy controller may receive inputs indicative of an available charging power, a LV battery SOC, a HV battery SOC, a target SOC, current calendar date, a time of day, and ambient temperature. The adaptive non-charging loads energy controller may be configured to output an estimated non-charging loads energy based on and corresponding to the received inputs.

The estimated non-charging loads energy may be updated based on the difference between the actual non-charging loads energy and estimated non-charging load energy. Accordingly, the estimated non-charging loads energy during charging may improve the estimation of the energy required for charging and may result in more accurate charge start times, charge scheduling, and charge time estimation. Thus, the adaptive non-charging loads energy controller may be configured to identify patterns among multiple interacting factors that contribute to the amount energy non-charging loads during charging which are not easy to calculate. The adaptive non-charging loads energy controller may then determine charging start times and estimated charge time based on varying conditions, such as, but not limited to, driving/charging patterns of the customer and degradation of the HV and LV battery caused by battery aging, efficiency of charging, variations in ambient temperature, etc.

FIG. 1 illustrates an example system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. The traction battery 106 may comprise a plurality of battery cells (not illustrated), e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the hybrid powertrain controller 110 and may command to charge and discharge the traction battery 106 responsive to one or more signals from the hybrid powertrain controller 110. As described in further detail in reference to at least FIG. 2A, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200 Å DC charging, Level 3 200-450V and up to 400 Å DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

Figure 2A:
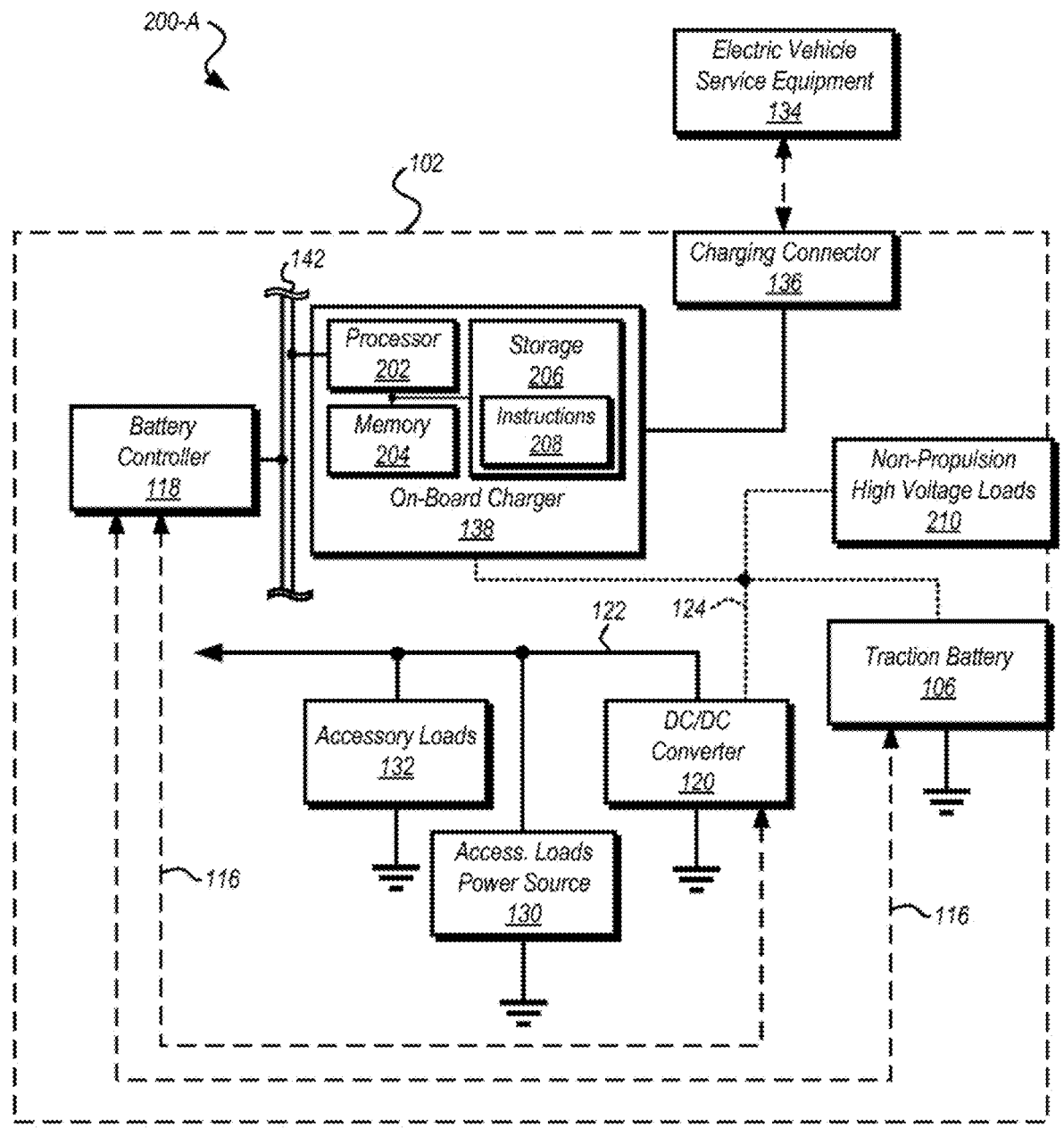
FIG. 2A is a block diagram illustrating a traction battery charge time determination system.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition off and/or engine off states. Still other examples of powering the FIG. 2A illustrates an example charging system 200-A of the vehicle 102. The charger 138 may include one or more processors 202 connected with both a memory 204 and a computer-readable storage medium 206 and configured to perform instructions, commands, and other routines in support of the processes described herein. For instance, the charger 138 may be configured to execute instructions 208 of battery charging applications to provide features such as one-time or recurring charging scheduling, time remaining to full charge, charging completion alerts, and cabin conditioning preferences during charging and/or immediately following charging completion. Such instructions 208 and other data may be maintained in a non-volatile manner using a variety of types of computer-readable storage medium 206. The computer-readable medium 206 (also referred to as a processor-readable medium or storage) includes any non-transitory (e.g., tangible) medium that participates in providing instructions or other data that may be read by the processor 202 of the charger 138. Computer-executable instructions 208 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The charger 138 may be in communication, e.g., via an in-vehicle network 142, with the battery controller 118. As some examples, the in-vehicle network 142 may include a vehicle controller area network (CAN), an Ethernet network, and a media-oriented system transfer (MOST). For example, responsive to detecting that the EVSE 134 has been connected to the vehicle 102 via the connector 136, the charger 138 may send a signal to the battery controller 118 indicative of a request to initiate energy transfer to the vehicle 102. The charger 138 and/or the battery controller 118 may then initiate operations, e.g., opening or closing a plurality of switches and so on, to allow the transfer of electric energy from the EVSE 134 to the vehicle 102. In one example, initiating energy flow from the EVSE 134 to the vehicle 102 may include initiating energy flow from the EVSE 134 to all electrical loads of the vehicle 102. The electrical loads of the vehicle 102 receiving power during a given charging session may include charging loads, e.g., the traction battery 106, and non-charging loads, i.e., all electrical loads other than the traction battery 106 being charged. As some examples, the non-charging loads receiving power during a given battery charging session may include the high-voltage electrical loads, such as, but not limited to, compressors and electric heaters, and the low-voltage electrical loads, such as, but not limited to, accessory loads. In some instances, initiating flow of charge to the vehicle 102 may initiate energy flow to the DC/DC converter 120 connected 122 to one or more accessory loads power sources 130 that in turn power the accessory loads 132.

Figure 2B:
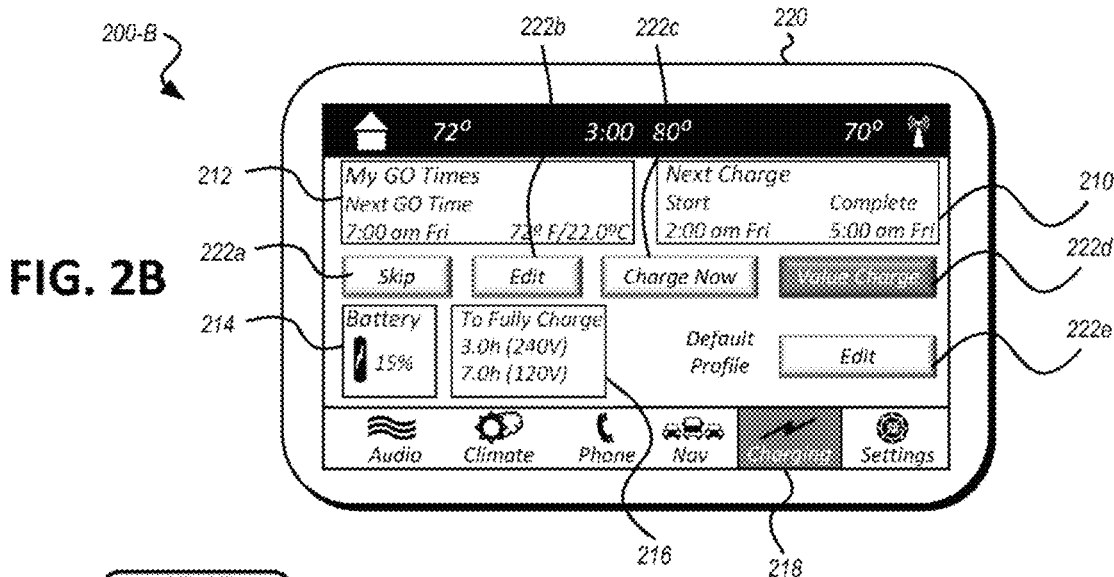
FIG. 2B is a block diagram illustrating a traction battery charge time display system.

FIG. 2B illustrates an example digital user interface visualization 200-B for estimating a charging time to charge the traction battery 106 of the vehicle 102. A display 220 may be electrically connected to and in communication with the charger 138 and/or the battery controller 118. In some instances, the display 220 may be connected to and in communication with other systems, subsystems, and controllers of the vehicle 102, such as, but not limited, infotainment, interior climate control, vehicle 102 navigation, and modem. The display 220 may include an input interface configured to receive tactile input and corresponding processor, memory, and volatile and non-volatile storage systems that execute and store instructions consistent with the received input. Additionally or alternatively, the display 220 may include an output interface configured to render one or more digital visualizations corresponding to signals from one or more vehicle controllers, received tactile or button inputs of the user, according to audio/video input devices connected thereto, and so on. As some examples, the display 220 may be configured to render digital visualizations related to vehicle 102 functionality, such as, infotainment, interior climate control, vehicle navigation, and modem.

As one example, the digital visualization 200-B may be indicative of a vehicle charging application 218 and may be rendered in response to detecting a corresponding user selection and/or a vehicle system signal or command. In some instances, the digital visualization 200-B may be rendered in response to detecting that the EVSE 134 has been connected to the vehicle 102. The charging application 218 may be configured to receive input and provide output related to scheduling and/or initiating transfer of electric energy to the vehicle 102, e.g., charging the traction battery 106 and/or powering other non-charging electrical loads of the vehicle 102. The charging application 218 may include a plurality of user or system modifiable or non-modifiable, user-entered, or system-determined values related to scheduling and/or initiating transfer of electric energy to the vehicle 102.

As one example, a next charge display area 210 may include one or more values indicative of an upcoming charging start and/or end dates and times and may be determined and rendered based on a previously-defined charging schedule, a user-preferred charging times, and so on. As another example, a go-time display area 212 may include one or more values indicative of an expected dates and times the vehicle 102 may be driven and may be determined and rendered based on a previously-defined or system-detected user driving schedule. As still another example, a charge level display area 214 may include one or more values indicative of a present charge level of the traction battery 106 determined and rendered based on the SOC of the traction battery 106 detected by the battery controller 118 and/or the charger 138. As yet another example, a time-to-full charge display area 216 may include one or more values indicative of a period of time to fully charge the traction battery 106 and may be determined and rendered based on the SOC of the traction battery 106, rate of charge transfer (e.g., slow or fast charge), and other present system parameters, operating conditions, and so on.

In some instances, one or more values of the display areas 210, 212, 214, and 216 may be based on signals indicative of one or more system operating parameters received by the charger 138 and the battery controller 118, such as a present available charging power of the connected EVSE 134, present input current and/or voltage from the connected EVSE 134 to the vehicle 102, the SOC of the accessory power sources 130, a present SOC of the traction battery 106, a target SOC of the traction battery 106 to be achieved during the next charging event, and so on. In some other instances, one or more values of the display areas 210, 212, 214, and 216 may be based on signals indicative of one or more parameters external to the vehicle 102, such as, but not limited to, present ambient air temperature in the vicinity of the vehicle 102, a calendar season, a time of year, and time of day of the present charging event, and so on.

The digital visualization 200-B may include a plurality of user or system controls 222, e.g., soft buttons, keys, and so on, configured to receive input or command to modify values of the display areas 210, 212, 214, and 216 according to which the electric charge may be transferred to the vehicle 102. The controls 222 may be configured to receive commands to initiate charging of the traction battery 106 by the EVSE 134 either immediately or at a later date and time. While the controls 222 are shown as soft keys rendered on the display 220, other control types, including software or hardware controls are also contemplated.

Figure 3:
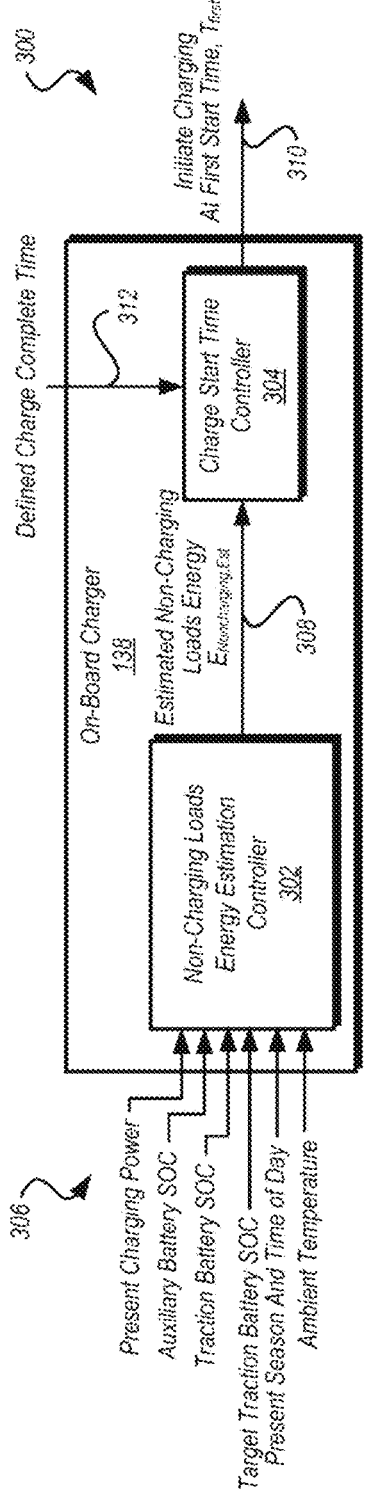
FIG. 3 is a block diagram illustrating input parameters for initiating charging at a first start time.

FIG. 3 illustrates an example system 300 for initiating charging of the traction battery 106 at a first start time, $T_{first}$, 310 to fully charge the traction battery 106 by a defined charge complete time 312. The charger 138 may include a non-charging load estimation controller 302 and a charge start time controller 304. The non-charging load estimation controller 302 may be configured to receive a plurality of signals indicative of one or more system operating parameters to initiate charging, based on the received signals, a period of time to reach a full charge on the traction battery 106. In one example, the non-charging load estimation controller 302 may be electrically connected to and in communication with the EVSE 134 and may be configured to receive, from the EVSE 134, a signal indicative of a present available charging power. In some instances, the non-charging load estimation controller 302 may detect the present available charging power based on present input current and/or voltage to the vehicle 102.

The non-charging load estimation controller 302 may receive one or more signals 306 indicative of SOC of the accessory power sources 130, a present SOC of the traction battery 106, a target SOC of the traction battery 106 to be achieved during a present charging event. Other inputs, signals, and operating parameters received from the EVSE 134 and/or vehicle 102 controllers are also contemplated. In some instances, one or more of the signals 306 received by the non-charging load estimation controller 302 may be indicative of one or more parameters external to the charging system, such as, but not limited to, present ambient air temperature in the vicinity of the vehicle 102, a calendar season, a time of year, and time of day of the present charging event, and so on.

The non-charging load estimation controller 302 may be configured to, based on the received signals 306, output a first estimated non-charging loads energy, $E_{Noncharging,Est}$ 308 indicative of energy estimated to be consumed by the non-charging loads during the first (present) charge session. In one example, the non-charging load estimation controller 302 may output the first estimated non-charging loads energy, $E_{Noncharging,Est}$ 308 to the charge start time controller 304 that, in turn, initiates energy transfer from the EVSE 134 to the vehicle 102 at a first start time, $T_{first}$ 310. The charge start time controller 304 may be configured to determine the first start time, $T_{first}$ 310 at which to initiate energy transfer to the vehicle 102 based on the received first estimated non-charging energy value, $E_{Noncharging,Est}$ 308 and the defined charge complete time 312.

Figure 4:
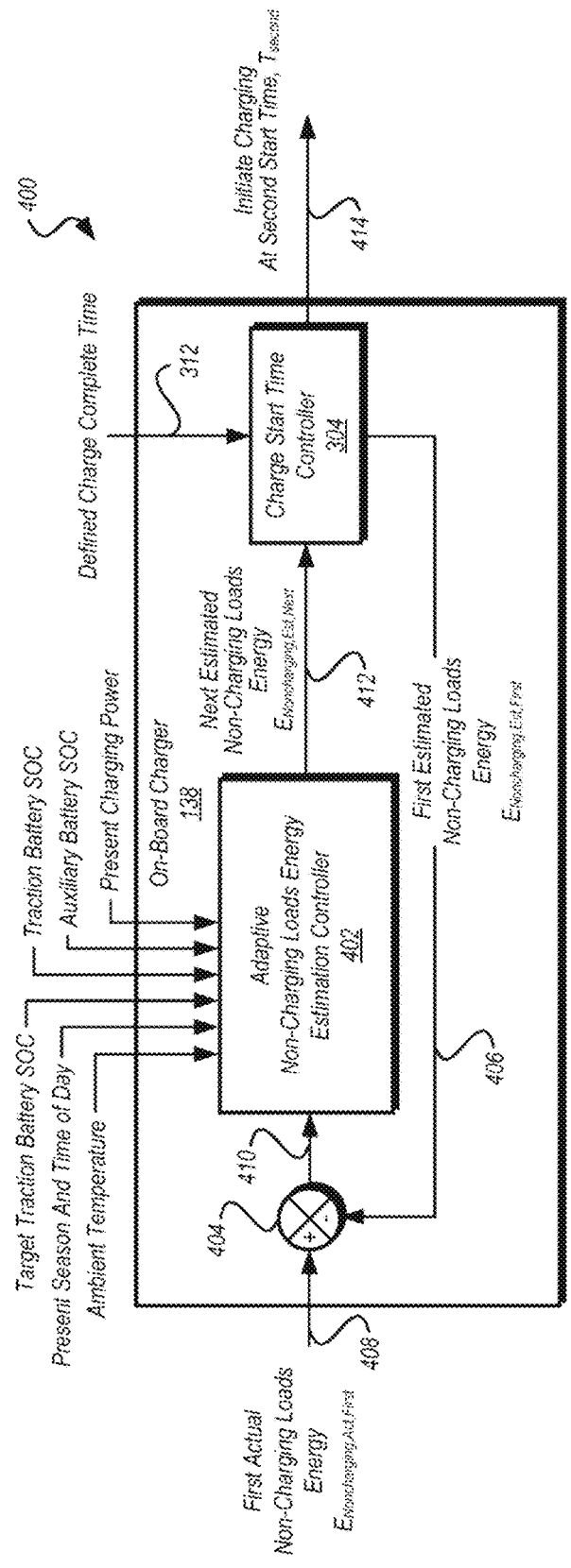
FIG. 4 is a block diagram illustrating feedback loop for initiating charging at a second start time.

FIG. 4 illustrates an example system 400 for initiating charging of the traction battery 106 at a second start time, $T_{second}$ 414 to fully charge the traction battery 106 by the defined charge complete time 312. The charger 138 may include an adaptive non-charging loads estimation controller (hereinafter, adaptive controller) 402 and a difference controller 404. The adaptive controller 402 may be configured to receive the signals 306, including SOC of the accessory power sources 130, a present SOC of the traction battery 106, a target SOC of the traction battery 106 to be achieved during a present charging event, and one or more parameters external to the charging system, such as, but not limited to, present ambient air temperature in the vicinity of the vehicle 102, a calendar season, a time of year, and time of day of the present charging event, and so on.

The adaptive controller 402 may be configured to receive, from the difference controller 404, a difference non-charging loads energy 410 signal. The difference signal 410 may be indicative of a difference between the first estimated non-charging loads energy, $E_{Noncharging,Est,First}$ 406, i.e., energy estimated to be consumed by the non-charging loads during the first charging session, and a first actual non-charging loads energy, $E_{Noncharging,Act,First}$ 408, i.e., energy actually consumed by the non-charging loads during the first charging session.

The charger 138 may be configured to determine the first actual non-charging loads energy, $E_{Noncharging,Act,First}$ 408 at the end of the first charging session based on a difference between energy transferred to the vehicle 102 by EVSE 134 and energy received by the traction battery 106. In one example, the charger 138 may determine the first actual energy used (or consumed) 408 by the non-charging loads by integrating energy consumed by the non-charging electrical loads over the entire period of the first charging session. For instance, the charger 138 may determine the first actual non-charging loads energy, $E_{Noncharging,Act,First}$ 408 according to:

$$E_{Noncharging,Act,First} = \sum_{t=1}^{t_{final}} V_{Main\ Bus}(I_{Charger} - I_{Traction\ Batt})\Delta t \quad (1)$$

where $V_{Main\ Bus}$ is indicative of voltage of the main bus, $I_{charger}$ is indicative of current input, by the EVSE 134, to the charger 138 of the vehicle 102, and $I_{Traction\ Batt}$ is indicative of current input to the traction battery 106 of the vehicle 102. In some examples, the difference controller 404 may be configured to determine the difference signal 410 by subtracting the first estimated non-charging loads energy, $E_{Noncharging,Est,First}$ 406, or energy estimated to be consumed by the non-charging loads during the first charging session, from the first actual non-charging loads energy, $E_{Noncharging,Act,First}$ 408, or energy actually consumed by the non-charging loads during the first charging session.

The adaptive controller 402 may be configured to, based on the received signals 306 and 410, output a next estimated non-charging loads energy, $E_{Noncharging,Est,Next}$ 412 indicative of energy estimated to be consumed by the non-charging loads during the next charging session. In one example, the adaptive controller 402 may output the next estimated non-charging loads energy, $E_{Noncharging,Est,Next}$ 412 to the charge start time controller 304 that, in turn, initiates energy transfer from the EVSE 134 to the vehicle 102 at the second start time, $T_{second}$ 414. The charge start time controller 304 may be configured to determine the second start time, $T_{second}$ 414 at which to initiate energy transfer to the vehicle 102 based on the received next estimated non-charging energy value, $E_{Noncharging,Est,Next}$ 412 and the defined charge complete time 312.

Thus, the charge start time controller 304 estimates, for a present charging event, a start time to fully charge the traction battery 106 by the defined charge complete time 312 based on a combination of energy estimated to be consumed by the non-charging loads during a previous (first) charging session and energy actually consumed by the non-charging loads during the previous (first) charging session. The first charging session may be a charging session including a pair of charging initiation and completion signals occurring immediately prior to initiation of the next charging event.

Figure 5A:
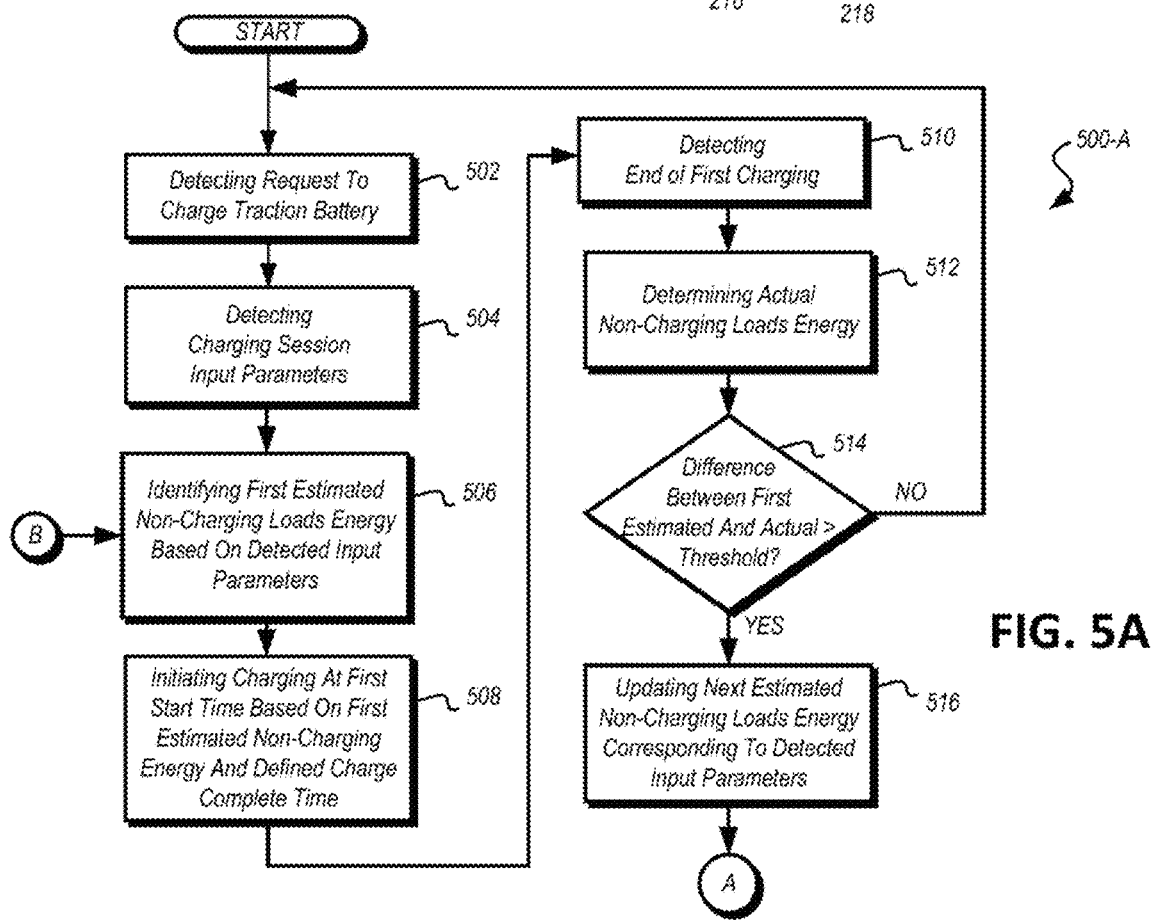
FIGS. 5A-5B are flowcharts illustrating algorithms for initiating charging at a predefined start time to fully charge a traction battery by a defined charge complete time.
Figure 5B:
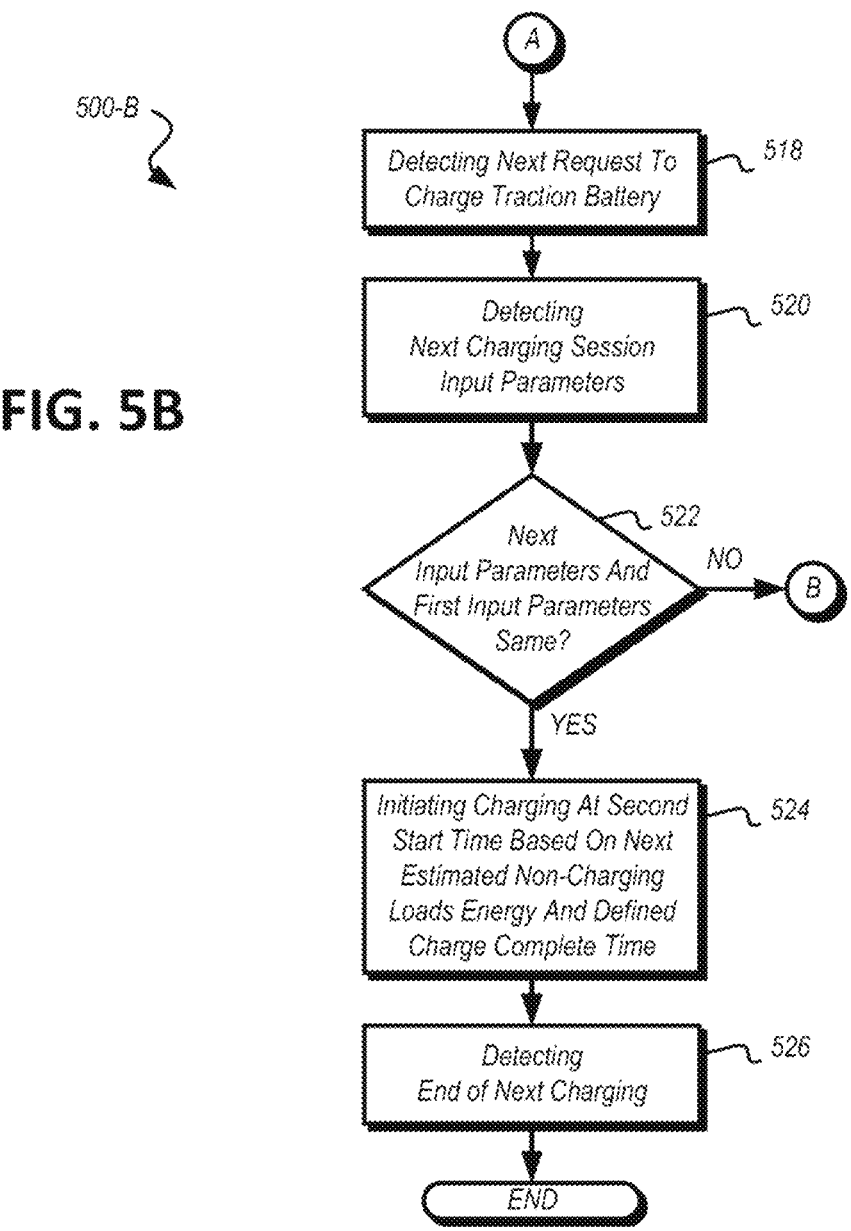

FIGS. 5A and 5B illustrate example processes 500-A and 500-B, respectively, for initiating charging, at a predefined start time, to fully charge the traction battery 106 by the defined charge complete time 312. In some instances, one or more blocks of the processes 500 may be instructions stored in corresponding volatile or non-volatile memory and data store and executed by the corresponding processors of one or more controllers of the vehicle 102, such as, but not limited to, the charger 138, the charge start time controller 304, the adaptive controller 402, and the difference controller 404. Different arrangements and configurations of executing one or more blocks of the processes 500 are also contemplated.

The process 500-A may begin at block 502 where the charger 138 detects a request to charge the traction battery 106 of the vehicle 102. In one example, the charger 138 may detect that electrical connector pins of the EVSE 134 have been inserted in the corresponding slots of the vehicle charging connector 136. At block 504 the charger 138 detects one or more input parameters of the charging session. Examples of the input parameters include, but are not limited to, signals indicative of SOC of the accessory power sources 130, SOC of the traction battery 106, a target SOC of the traction battery 106 to be achieved during a charging session, and one or more parameters external to the charging system, such as, but not limited to, present ambient air temperature in the vicinity of the vehicle 102, a calendar season or a time of year, e.g., winter, spring, summer, or fall, and a time of day.

At block 506 the charger 138 identifies, from the input parameters, the first estimated non-charging loads energy, $E_{Noncharging,Est,First}$. The charger 138, at block 508, initiates charging of the traction battery 106 at the first start time, $T_{first}$ based on the first estimated non-charging loads energy, $E_{Noncharging,Est,First}$ and the defined charge complete time 312. At block 510 the charger 138 may detect that the traction battery 106 has been fully charged. Upon charge completion, the charger 138, at block 512, determines the first actual non-charging loads energy, $E_{Noncharging,Act,First}$ 408. In one example, the charger 138 may determine the first actual non-charging loads energy, $E_{Noncharging,Act,First}$ 408 based on a difference between energy transferred to the vehicle 102 by EVSE 134 and energy received by the traction battery 106. In another example, the charger 138 may determine the first actual non-charging loads energy, $E_{Noncharging,Act,First}$ 408 by integrating energy consumed by the non-charging electrical loads over the entire period of the first charging session.

At block 514 the charger 138 may determine whether a difference between the first estimated non-charging loads energy, $E_{Noncharging,Est,First}$ 406, or energy estimated to be consumed by the non-charging loads during the first charging session, and the first actual non-charging loads energy, $E_{Noncharging,Act,First}$ 408, or energy actually consumed by the non-charging loads during the first charging session is greater than a threshold. In one example, the charger 138 may subtract the first estimated non-charging loads energy, $E_{Noncharging,Est,First}$ 406 from the first actual non-charging loads energy, $E_{Noncharging,Act,First}$ 408 and determine whether the difference is greater than a threshold. If the difference is smaller than a threshold, the charger 138 may return to block 502 where it may await detecting of a request to charge the traction battery 106.

Responsive to the difference between the first estimated and actual non-charging load energies being greater than a threshold, the charger 138, at block 516, updates the next estimated non-charging loads energy, $E_{Noncharging,Est,Next}$ corresponding to the detected input parameters. With reference to FIG. 5B, the process 500-B for initiating charging, at a second start time, to fully charge the traction battery 106 by the defined charge complete time 312 is illustrated. The charger 138, at block 518, detects a next request to charge the traction battery 106.

At block 520 the charger 138 detects next charging session input parameters. The charger 138 may then proceed to block 524 where it initiates charging, at a second start time, to fully charge the traction battery 106 by the defined charge complete time 312 based on the next estimated non-charging loads energy, $E_{Noncharging,Est,Next}$. In some examples, after detecting the next charging session input parameters, the charger 138 may proceed to block 522, where the charger 138 compares the detected next charging session input parameters with the first input parameters of the first charging session. Examples of the first and next session input parameters include, but are not limited to, signals indicative of SOC of the accessory power sources 130, SOC of the traction battery 106, a target SOC of the traction battery 106 to be achieved during a charging session, and one or more parameters external to the charging system, such as, but not limited to, present ambient air temperature in the vicinity of the vehicle 102, a calendar season or a time of year, e.g., winter, spring, summer, or fall, and a time of day.

In one example implementation, if the next charging session parameters and the first charging session input parameters are not the same, the charger 138 may return to block 506 where it determines estimated non-charging loads energy based on the detected input parameters of the next charging session. Additionally or alternatively, if the next charging session input parameters and the first charging session input parameters are same, the charger 138 at block 524 initiates charging, at a second start time, to fully charge the traction battery 106 by the defined charge complete time 312 based on the next estimated non-charging loads energy, $E_{Noncharging,Est,Next}$. At block 526 the charger 138 may detect that the traction battery 106 has been fully charged. The processes 500-A and 500-B may then end.

In some examples, the processes 500 may be repeated in response to detecting a request to charge the traction battery 106 or in response to another signal or request. In some other instances, responsive to completion of the next charging session at block 526, the charger 138 may be configured to determine the next actual non-charging loads energy, $E_{Noncharging,Est,Next}$ based on a difference between energy transferred to the vehicle 102 by EVSE 134 and energy received by the traction battery 106 during the next charging session. The charger 138 may then update the next estimated non-charging loads energy, $E_{Noncharging,Est,Next}$, corresponding to the input parameters of the next charging session based on a difference between value of the next estimated non-charging loads energy, $E_{Noncharging,Est,Next}$ used to determine the second start time during the next charging session and the next actual non-charging loads energy, $E_{Noncharging,Est,Next}$, consumed during the next charging session.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
    a battery; and
    a charge controller configured to,
        for a first charge cycle, initiate charging of the battery at a first start time identified from a defined charge complete time and a first energy estimate of non-charging loads, and,
        for a next charge cycle and same defined charge complete time, initiate charging of the battery at a next start time, later than the first start time, identified from the same defined charge complete time and actual energy consumed by the non-charging loads during the first charge cycle, wherein the non-charging loads include loads created by parameters external to the battery during the first charge cycle.

2. The vehicle system of claim 1, wherein the charge controller is further configured to charge the battery for the first charge cycle at a first rate identified from the defined charge complete time, and charge the battery for the next charge cycle at a next rate, different than the first rate, identified from the same defined charge complete time and the actual energy consumed.

3. The vehicle system of claim 1, wherein the charging during the first and next charge cycles is performed at a same rate.

4. The vehicle system of claim 1, wherein the charge controller is further configured to identify the first and next start times based on ambient temperature or humidity.

5. The vehicle system of claim 1, wherein the charge controller is further configured to identify the first and next start times based on calendar date or time of day.

6. The vehicle system of claim 1, wherein the charge controller is further configured to identify the first and next start times based on available charging power, a measured traction battery state-of-charge (SOC), a measured auxiliary battery SOC, or a target traction battery SOC.

7. A method comprising:
    by a controller,
        for a first charge cycle, charging a battery at a first start time identified from a predefined complete time, and,
        for a next charge cycle and same predefined complete time as the first charge cycle, charging the battery at a next start time, later than the first start time, identified from the same predefined complete time and actual energy consumed by non-charging loads during the first charge cycle, wherein the non-charging loads include loads created by parameters external to the battery during the first charge cycle.

8. The method of claim 7, wherein the charging for the first charge cycle is at a first rate identified from the predefined complete time, and the charging for the next charge cycle is at a next rate, less than the first rate, identified from the same predefined complete time and the actual energy consumed.

9. The method of claim 7, wherein the charging during the first and next charge cycles is performed at a same rate.

10. The method of claim 7, wherein the charging during the charge first cycle is at a first rate and the charging during the next charge cycle is at a next rate, greater than the first rate.

11. The method of claim 7, wherein the first and next start times are further identified based on ambient temperature or humidity.

12. The method of claim 7, wherein the first and next start times are further identified based on calendar season or period of day.

13. The method of claim 7, wherein the first and next start times are further identified based on available charging power, a measured traction battery state-of-charge (SOC), a measured auxiliary battery SOC, or a target traction battery SOC.

\* \* \* \* \*